United States Patent [19]

Trolle

[11] Patent Number: 4,542,689
[45] Date of Patent: Sep. 24, 1985

[54] APPARATUS FOR SORTING PACKAGINGS SUCH AS CANS BASED ON THE MATERIAL THEREOF

[76] Inventor: Sten Trolle, Skansgränd 7, Ystad, Sweden

[21] Appl. No.: 491,320

[22] PCT Filed: Aug. 16, 1982

[86] PCT No.: PCT/SE82/00260
§ 371 Date: Apr. 14, 1983
§ 102(e) Date: Apr. 14, 1983

[87] PCT Pub. No.: WO83/00644
PCT Pub. Date: Mar. 3, 1983

[30] Foreign Application Priority Data

Aug. 18, 1981 [SE] Sweden ............................... 8104897

[51] Int. Cl.⁴ .......................... B30B 15/30; B07C 5/34
[52] U.S. Cl. ..................................... 100/215; 100/233; 100/902; 209/557; 209/559; 209/699; 209/930
[58] Field of Search ............... 209/557, 599, 629, 630, 209/682, 699, 930; 100/91, 215, 233, 902

[56] References Cited

U.S. PATENT DOCUMENTS

| | | | |
|---|---|---|---|
| 2,912,105 | 11/1959 | Allured et al. | 209/599 X |
| 3,062,130 | 11/1962 | Huber et al. | 100/215 X |
| 3,412,675 | 11/1968 | Killough et al. | 100/215 |
| 3,580,167 | 5/1971 | Simshauser | 100/902 X |
| 3,777,659 | 12/1973 | McCarten | 100/233 |
| 3,780,647 | 12/1973 | Reimers | 100/215 X |
| 3,788,466 | 1/1974 | Wilson et al. | 209/599 |
| 3,827,351 | 8/1974 | Rosenow | 100/902 X |
| 4,248,144 | 2/1981 | Morgan | 100/902 X |
| 4,316,410 | 2/1982 | Davis, Jr. | 100/215 X |

FOREIGN PATENT DOCUMENTS 52-8683  1/1977  Japan ................................ 100/91

Primary Examiner—Robert B. Reeves
Assistant Examiner—Edward M. Wacyra
Attorney, Agent, or Firm—Roberts, Spiecens & Cohen

[57] ABSTRACT

Apparatus for sorting packagings such as cans of a certain type of material from packagings of other types of materials comprising a support member transporting the packagings one by one to a compression station at which are disposed first and second pressing members arranged to move relative to each other to compress the packagings transported by the supporting member. The relative movement of the pressing members and transfer of the packagings when relative movement of the pressing chambers has ceased is controlled by a regulating mechanism such that when compressive forces of a magnitude within a predetermined range required for packagings of the type of material in question allow the pressing members to move towards each other to complete the pressing operations whereby the packagings are compressed to a size before transfer to a collecting device. In the case of compressive forces of a magnitude outside the predetermined range, the packagings are prevented from being transferred to the collecting device. The support member is movable relative to the pressing members and comprises a loading member which places the packagings in position for compression between the pressing members.

6 Claims, 10 Drawing Figures

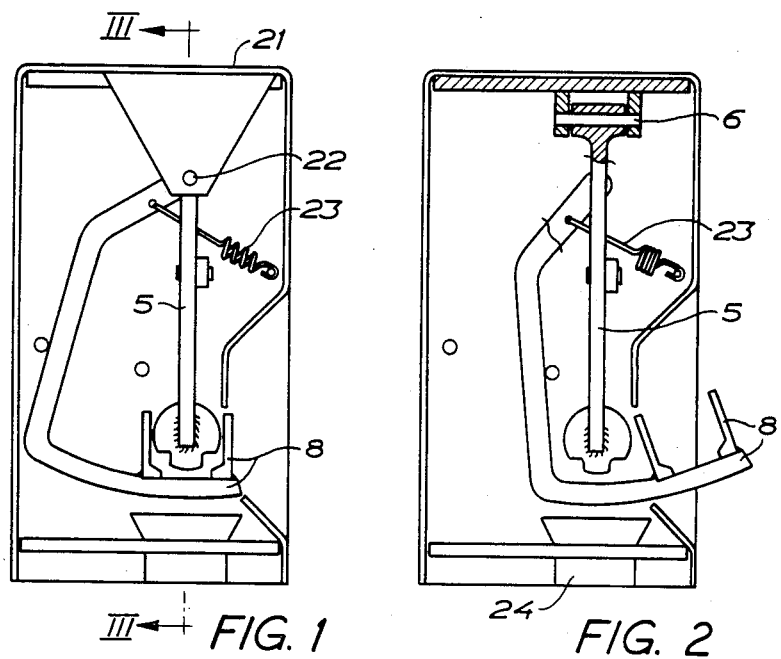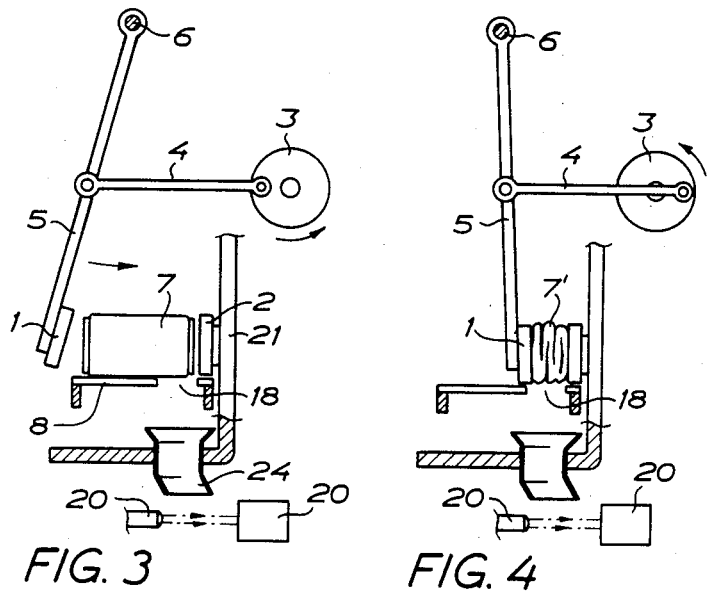

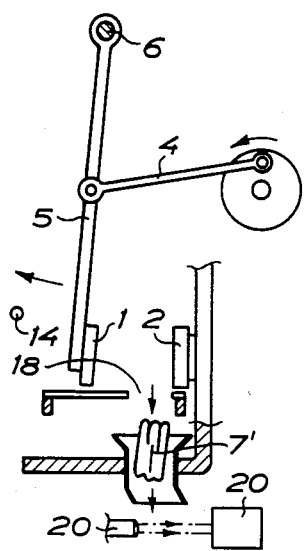
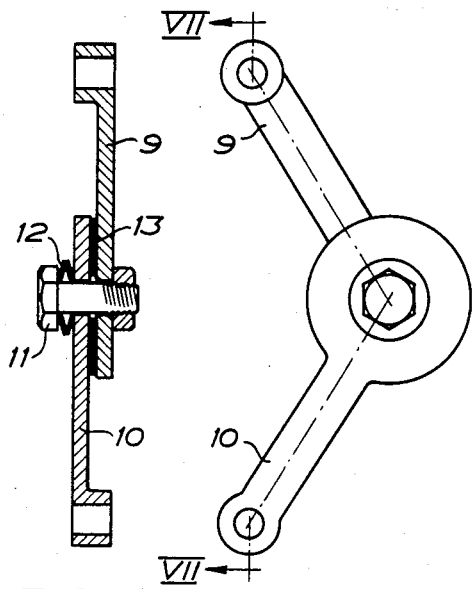
FIG. 5   FIG. 7   FIG. 6
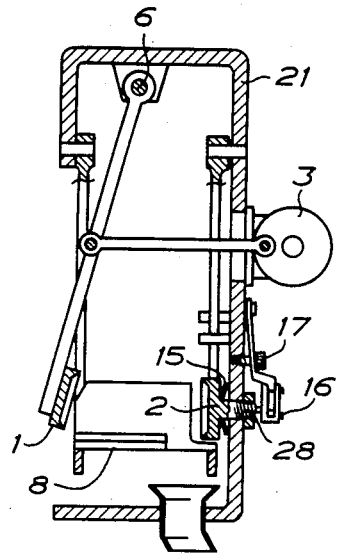
FIG. 8

APPARATUS FOR SORTING PACKAGINGS SUCH AS CANS BASED ON THE MATERIAL THEREOF

The present invention relates to the sorting of packagings of a certain type of material from packagings of other types of materials and more precisely to apparatus for sorting packagings in which the packaging is subjected to a compressive force and sorting is based on the deformation or the final shape thus given to the packaging and/or the magnitude of the compressive force used.

DESCRIPTION OF PRIOR ART

Sorting articles or goods according to such properties as size, shape, color, material, density, etc. is previously known. In sorting based on size or shape the actual dimensions of the articles or the goods constitute the basis for sorting.

DEOS No. 2 925 946 discloses a device for sorting objects in which sorting is based on the elasticity of the objects. A hammer drops onto the objects and they are sorted according to the magnitude of the rebound that occurs.

SUMMARY OF THE INVENTION

According to the invention the packaging is subjected to a compressive force in order to permit sorting of the packaging based on the magnitude of the employed force, power, energy and/or the deformation and final shape thus given to the packaging. Since the power and the energy used are both dependent on the compressive force (converted with regard to the instantaneous velocity and the path of the forcce) required during the compressing process, determination of the power and energy used constitutes a fundamental sorting criterion embraced by sorting based on the force employed.

In one version of the invention, sorting of the packaging is determined solely by the maximum compressive force used.

In an alternative version of the invention, sorting of the packaging is determined in part by the maximum compressive force used and in part by the shape of the packaging after compression.

In another alternative version of the invention the compressive force has a given maximum value and sorting of the packaging is determined by the deformation thus arising.

In still another alternative version of the invention the compressive force similarly has a given maximum value and sorting of the packaging is determined by its dimensions after deformation.

According to yet another alternative version of the invention the compressive force ceases when the packaging has assumed a predetermined minimum size, whereby the packaging is sorted into a special receiving member when the predetermined minimum size is attained as a result of a compressive force less than or alternatively greater than a given value.

In one version of the invention, the packagings are chiefly of cylindrical shape and the compressive force is applied substantially along the axis of the packaging.

In another version of the invention the power consumption during the compressing process is recorded while in still another version of the invention the energy used for compressing each individual packaging is recorded. When power consumption is recorded the compressive force used is calculated by means of conversion means, mainly of electronic type, taking into account the relative movements of the pressing members. It is of course possible in an alternative version to compare the measured power directly with the power consumption determined necessary for compressing packagings of the type of material in question. When energy consumption is recorded, the actual energy consumption is compared with the energy required to compress a packaging of the type of material in question. For example, in the case of measured energy within the interval which it has been determined characterizes packagings of the type of material in question the compressed packaging is accordingly classified among packagings which are sorted out. Such recording means are, in that case, incorporated in the power supply circuit for the drive member while the conversion means, for example, are also connected to indicating means showing the relative movement of the pressing members.

It will readily be realized that a device in accordance with the previous paragraph can easily be fitted with conversion means for determining the compressive forces, deformation during compression and dimensions of the compressed packaging on application of the above sorting principles.

Incorporated in a device according to the invention is a supporting member and first and second pressing members. The two pressing members are arranged to describe relative motion towards and away from each other. The packaging is then carried by the supporting member which is provided with an opening. On movement of the pressing members towards each other packagings having a mechanical strength within a definite range are compressed, principally to such a final correct shape as to permit passage of the packaging through the opening which accordingly separates the packaging from other received goods.

The supporting member is principally arranged so as to be capable of movement relative to the pressing members and also constitutes in one version a loading member for placing packagings in position for compression between the pressing members.

In one version of the invention one of the pressing members is stationary while the other is moved by means of a drive member through the intermediary of a drive mechanism and an associated overload coupling. This has an adjustment to interrupt the movement of the pressing member at a predetermined maximum compressive force. The drive mechanism consists of two arms arranged at an angle to each other and joined together by means of a friction connection.

In an alternative version of the invention one of the pressing members is spring-loaded and placed in an opening. When the compressive force exceeds a predetermined maximum value the other pressing member moves away under spring force and the packaging is removed from the supporting member and discharged through the opening.

In yet another version of the invention one of the pressing members is spring-loaded so that when it is in a yielded position it actuates a switch which affects the movement of the movable pressing member. When the switch is actuated, the movement of the movable pressing member is reversed, for example, so that it returns to its starting position. The spring force of the spring-loaded second pressing member is thereby adapted to actuate the switch upon development of a pressing force exceeding a predetermined maximum value.

Within the scope of the invention there are naturally other versions for limiting the maximum compressive forces, which are based on limiting the available force, to ensure that only a force of a magnitude within a predetermined range is used to compress the packaging to the right shape. For example, in connection with compressing a packaging which in order to assume the right shape requires greater force than that applied within the range determined, the limitation of force results in the packaging not being deformed sufficiently to allow its passage through the opening in the supporting member.

In certain applications, a member is also arranged for sensing the number of packagings passing through the opening in the supporting member. This in one version is only an accumulating counter, in another version it comprises documentation of the packaging introduced on each occasion, including for example cash payment in the form of coins or tokens, etc. In this connection the sensing member is principally arranged so that it only senses such packagings as are compressed to the right shape by the application of forces within the above-mentioned range.

BRIEF DESCRIPTION OF THE FIGURES OF THE DRAWING

The present invention is described in greater detail with reference to the drawing, in which FIGS. 1 and 2 are diagrammatic side elevation views of a sorting device in two operational states, FIG. 3 is a cross-section taken on line III—III in FIG. 1 with a packaging placed in the sorting device, FIG. 4 shows the same cross-section as in FIG. 3 where the packaging has undergone axial compression, FIG. 5 shows the same cross-section as in FIG. 3 where the packaging leaves the sorting device, FIG. 6 is a side view of a drive mechanism consisting of arms joined together by means of a friction connection, FIG. 7 is a cross-section taken on line VII—VII in FIG. 6, FIG. 8 is a sectional view of a version of the invention with a switching member controlled by one of the pressing members and arranged to engage and disengage the drive member for moving the other pressing member.

DETAILED DESCRIPTION OF PREFERRED EMBODIMENTS

Figure 9:
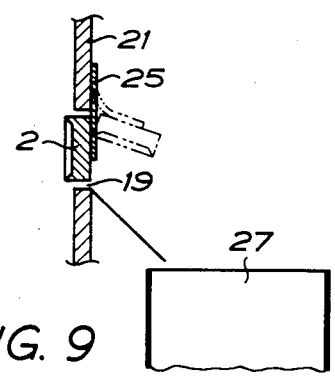
FIG. 9 shows, partly in section, a detail of the sorting device with one of the pressing members suspended by a spring

FIGS. 1-5 illustrate a frame 21 in which is arranged a bearing 22 for the pivoted suspension of a supporting member 8 for a packaging 7. By means of drive means (not shown in the figures) the supporting member is moved from the position shown in FIG. 2 to the position shown in FIG. 1. This naturally also includes purely manual operation of the supporting member. A spring 23 returns the supporting member to the position shown in FIG. 2 after the drive member has been disengaged from supporting member 8. The part of the supporting member carrying the packaging 7 is arranged with an opening 18.

The apparatus also contains a first pressing member 1 and a second pressing member 2. The first pressing member is secured to a lever 5 which, via a connecting rod 4, is connected to an eccentric 3 which in turn is connected to a drive member for rotating the eccentric in the direction of the arrow. Here, too, the drive member may consist for example of a manually operated lever, pedal, etc. The first pressing member is arranged at one end of the lever 5 while the other end of the lever is pivoted in a bracket 6. The two pressing members 1 and 2 are arranged on either side of the opening 18. Under the opening 18 is a funnel-like receiving member 24. Also arranged adjacent to opening 18 is a member 20 for receiving the packagings passing through the opening and a collecting device 26 for accepted packagings (shown in FIG. 5 only). A second collecting device 27 for unaccepted packagings is shown in FIG. 9 beside the second pressing member 2.

Figure 10:
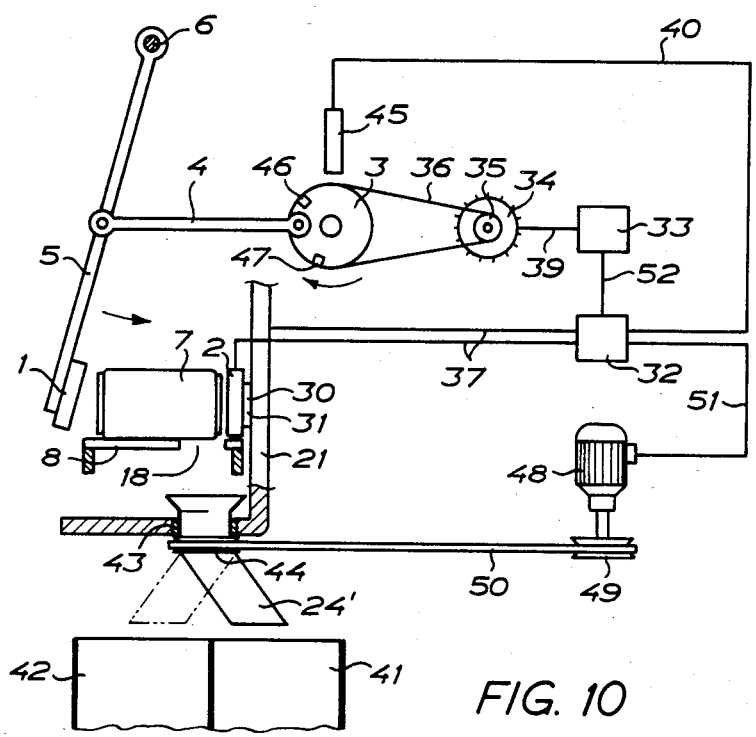
FIG. 10 shows a version of the invention with recording members for power or energy consumption connected to the drive member for the pressing members and with calculating means for evaluating the measured values.

FIG. 10 shows a particular version of the invention where a recording member 33 is connected by means of signal lines 39 to a drive member 34, in the form of an electrical motor, for sensing the power, for example, supplied to the motor. The motor has a drive wheel 35 which via a transmission member 36, such a a toothed belt, transmits the motion of the drive wheel to eccentric 3. A conversion or calculating member 32 is connected via a signal line 52 to recording member 33. The conversion member is, in one version, also connected via signal lines 40 to a transmitter (sensor) 45 arranged adjacent to eccentric 3 and interacting with pulse members 46, 47 arranged on the eccentric which indicate the starting position and the stopping position respectively of the packaging compression process. In an alternative version, a contact member 30 is arranged between the second pressing member 2 and the frame 21. Signal lines 37 connect conversion member 32 to the contact member which, together with the signal lines, forms a closed electric circuit, for example, when the second pressing member 2 subjects the packaging 7 to compressing forces.

FIG. 10 also shows an alternative version with a first collecting member 41 for packagings of the type of material in question and a second collecting member 42 for packagings of other types of materials. The funnel-like receiving member 24' is adjustable beween the two collecting members by swivelling in a bearing 43. A drive wheel 44 on the receiving member 24' is connected via a drive belt 50 (toothed belt) to drive wheel 49 on a motor 48 which in turn is connected to conversion member 32 via a signal line 51.

A packaging is placed on supporting member 8 when it is in the position shown in FIG. 2. The supporting member is then moved to the position shown in FIG. 1, following which the drive member for rotating eccentric 3 moves the first pressing member 1 from the position shown in FIG. 3 to the position shown in FIG. 4. This causes the packaging 7 to be compressed and assume the shape that is evident in FIG. 4. The first pressing member has in the process been moved to a position next to the edge of the opening 18 and the packaging has thereby been compressed so that its length between the first and the second pressing members is less than the distance between the corresponding edges of the opening. As the eccentric continues to rotate, the first pressing member is moved back to its starting position and the compressed packaging 7' drops through the opening 18 down into the funnel-like receiving member 24. Where applicable, the descending packaging is recorded by recording member 20 and the packaging is then received by the collecting device 26.

FIGS. 6-7 show a drive mechanism for the first pressing member where connecting rod 4 has been replaced by two arms 9 and 10 which form an angle to each other.

The arms are joined together by a bolt 11, and a spring washer 12 which exerts pressure on a friction connection 13 which enables arm 9 to move in relation to arm 10 under a certain degree of friction. As a result, in the event of an overload on the device due to a packaging with prohibited physical properties, for example, being subjected to compression the component corresponding to connecting rod 4 is extended in that the angle between arms 9 and 10 changes, causing compression of the packaging to cease. The version described makes it possible to set the maximum permissible compressive force for compressing the packaging. If this value is exceeded, compression of the packaging ceases and it cannot pass through the opening 18. When the supporting member returns to the position shown in FIG. 2, lever 5 moves against a stop 14 and causes the arms 9 and 10 to return to their original positions relative to each other.

Lever 5 can also be fitted with a toggle-joint which is pretensioned in such a manner that the joint is not activated until the load exceeds a certain value. In this alternative, packagings are also not compressed to the final shape which allow them to pass through the opening 18.

Other versions of the invention are also possible, such as with a telescopic connecting rod 4 which in the event of an overload is activated and can in such manner be extended. A heavily pretensioned spring also comprises an alternative.

FIG. 8 shows a version of the invention in which the second pressing member 2 is arranged with a form of spring return by means of a washer 15, a first force adjusting screw 17 and a second force adjusting screw 28. The first force adjusting screw 17 affects the position of a switch 16, principally an electric switch, which in it turn actuates a self-holding relay which reverses the motor driving the eccentric 3 to the starting position, following which the self-holding relay releases and the motor stops. The second force adjusting screw 28 regulates the position of the pressing member in the frame and consequently the pretensioning of washer 15. By means of the force adjusting screws 17 and 28 the maximum permissible compressing force is accordingly set. When the maximum permissible compressing force is exceeded, the second pressing member moves against the switch 16 whereby compression of the packaging ceases in accordance with the chain of events described above.

Shown in FIG. 9 is a cross-section of a part of a version of the invention in which the second pressing member 2 is arranged in an opening 19 by means of a spring device 25. When the compressing force exceeds a predetermined maximum value the second pressing member moves away under spring force and the first pressing member moves the packaging through the exposed opening 19. In the figure, the spring device 25 is shown only schematically but it can be designed in accordance with any known technique for moving aside a pressure plate when the pressing force against it attains a definite value.

From the detailed description relating to FIG. 10 it will be evident that the conversion member 32, depending on the version of the invention selected, satisfies the stated requirements of sorting out packagings of a certain type of material where sorting is based on the compressive force (power, energy) required during the compressing process. The recording member 33 accordingly informs calculating member 32 via signal lines 52 about the consumption of energy or power, for example, during the compressing process. Further, calculating member 32 receives via signal lines 40 the starting and stopping times for each individual compressing process. The invention also embraces the alternative of allowing the calculating member itself to determine these times from the shape of the power consumption curve. In yet another alternative the calculating member 32 uses the position of contact member 30 as a basis for determining the starting and stopping times of the compressing process.

Regardless of how calculating member 32 receives it information, it transmits, in the version shown in FIG. 10, control pulses for rotating motor 48 and consequently swivelling receiving member 24' towards one of the collecting members 40, 41.

In still another version the contact member 30 is replaced by a load-sensing cell 31 which via connecting line 37 transmits information about the magnitude of the compressive force to calculating member 32.

A person skilled in the art will readily appreciate that the alternative versons described with reference to FIG. 10 can also be combined with versions described earlier. Accordingly, swivelling of the receiving member 24', for example, is replaced by transmitting pulses to motor 34 so that it reverses the rotation of eccentric 3 in order to interrupt compression of the packagings and possibly return them to the loading position in the event that the packagings do not consist of the type of material in question.

On application of the invention to can-shaped packagings, axial compression of the packaging is principally used. The advantage of this is that the compressing tools or pressing members can be of a shape which only slightly exceeds the size of the end surfaces of the packaging. Another advantage of axial compression is that the packaging is compressed without surrounding support. In devices where can-shaped packagings are compressed at right angles to the generatrix, the projected area of the compressed can occupies a much larger area then that of the uncompressed can and the compressing tools therefore require a correspondingly larger area as compared with the tool area of a device according to the invention.

In addition to the above description the invention will be evident from the following patent claims.

I claim:

1. A device for sorting packagings of a certain type of material from packagings of other types of materials, said apparatus comprising supporting means for transporting the packagings one by one to a compression station, first and second pressing members at said station arranged to move relative to each other to compress packagings transported by the supporting means, means for regulating the relative movement of the pressing members and for regulating the transfer of the packagings when relative movement of the pressing members has ceased, such that the pressing members, in the case of compressive forces of a magnitude within a predetermined range of compressive force required for packagings of the type of material in question, allow movement of the pressing members towards each other to be completed, whereby the packagings assume a correspondingly maximum size before transfer to a collecting device for packagings of the type of material in question and, in the case of compressive forces of a magnitude outside said range prevent said packagings from being transferred to said collecting device, said supporting means being movable relative to the pressing members and comprising a loading member for placing the packagings in position for compression between the pressing members.

2. A device as in claim 1, wherein the supporting means has an opening the dimensions of which permit the passage of packagings of the type of material in question after the packaging has been compressed by the pressing members.

3. A device as in claim 1, comprising a drive member, a drive mechanism and an associated overload coupling connecting said drive member to the first pressing member in order to achieve its movement, said overload coupling being set to interrupt the movement of the first pressing member at a predetermined maximum compressive force of the first pressing member, said drive mechanism including two arms arranged at an angle to each other and joined together by a friction connection.

4. A device as in claim 1, wherein one of the pressing members has a spring return and provides an opening for a package so that, with a compressive force exceeding a predetermined maximum value, said one pressing member moves away under spring forces, whereby the packaging is moved away from the supporting means and thereby through said opening.

5. A device as in claim 1, wherein one of the pressing members has a spring return and a biased position which actuates a switch controlling said means which regulates the relative movement of the pressing members, the spring force required to bias said one pressing member being adapted for actuation of the switch by said one pressing member for a compressive force exceeding a predetermined maximum value.

6. A device as in claim 1, wherein the regulating means comprises a conversion member of electronic type arranged to receive signals from means which, in connection with the relative movements of the pressing member towards each other, senses the conditions for compressing the packaging and the conversion member is connected to control and checking means which are connected in turn to first drive means for the relative movements of the pressing members and to further drive means for repositioning a receiving member between at least two collecting members for packagings, whereby the conversion member transmits control pulses to the control and checking means and to the first drive means and to the further drive means, respectively, to interrupt compression of the packaging and to reposition the receiving member relative to the collecting member for packagings of other materials than the type of material in question when the conversion member classifies the packaging among a type of material other than the type of material in question.

* * * * *